Aug. 14, 1951  K. J. McLEAN  2,564,120
TEMPERATURE CONTROL WITH LAG COMPENSATION
Filed June 2, 1947  3 Sheets-Sheet 1

INVENTOR.
KENNETH J. MC. LEAN
BY
Reynolds & Beach
ATTORNEYS

INVENTOR.
KENNETH J. MC. LEAN
BY
Reynolds + Beach
ATTORNEYS

Aug. 14, 1951  K. J. McLEAN  2,564,120
TEMPERATURE CONTROL WITH LAG COMPENSATION
Filed June 2, 1947  3 Sheets-Sheet 3

INVENTOR.
KENNETH J. Mc. LEAN
BY
Reynolds + Beach
ATTORNEYS

Patented Aug. 14, 1951

2,564,120

UNITED STATES PATENT OFFICE 2,564,120

TEMPERATURE CONTROL WITH LAG COMPENSATION

Kenneth J. McLean, Seattle, Wash.

Application June 2, 1947, Serial No. 751,727

7 Claims. (Cl. 236—9)

My invention relates to electric control mechanism and systems responsive to a change in temperature and operable to effect regulative action for maintaining predetermined temperature conditions or seeking a desired different condition. The control mechanism of this invention is applicable to, and the invention also includes various types of heating systems of which several preferred types have been described herein. Principally, the invention is concerned with the problem of providing sensitive and close temperature regulation at selected temperatures without the effects of lag or over response in the furnace or other heating means in producing temperature hunting or oscillations of noticeable magnitude.

A principal object of my control mechanism is to regulate the degree of change which it effects generally in accordance with the difference between the temperature to be regulated at the time the regulating operation is initiated and the temperature which it is desired to maintain. In accomplishing this object the control operation of my mechanism is interrupted before the desired temperature conditions are produced, but the interval of time between initiation of the control operation and its interruption varies with the difference between the temperature to be controlled at the initiation of such operation and the temperature to be maintained.

A further object of my invention is to restore the control mechanism gradually to its initial condition to afford a time lag during which the heating equipment adjusted by my control mechanism is afforded the opportunity of establishing the desired temperature. Special features of my mechanism insure that certain of its parts will be returned fully to their initial position despite such time lag.

An additional feature of my mechanism is its sensibility and ability to expedite additional control action to increase the heat delivery still further or to decrease such delivery, if excessive, in order to establish and maintain precisely the desired temperature conditions without hunting.

An additional feature of my control mechanism may render it operative at different control points or temperatures over succeeding periods, such as to maintain a lower temperature during the night than during the day, or to maintain a different temperature for a predetermined number of days.

A specific object of my control mechanism is to supplement the effect on a bimetallic thermal responsive element of the temperature of the zone to be heated by shifting the position of the support of such element or biasing that element in one direction or the other by heat locally generated, either to supplement or to oppose the temperature effect on it. Such shifting of the thermal responsive element support or anchor may be effected by local heating mechanism which itself may be actuated in response to ambient temperature changes.

In one phase of its operation once the thermal responsive control mechanism is actuated in advance of a change in temperature of the zone being heated, it is an object to supply protracted artificial force to the thermal responsive element after such operation to enable the heating conditions resulting from such actuation to reach an equilibrium prior to initiation of a subsequent control operation or actuation of the thermal responsive element, if such subsequent actuation be required to establish accurately the desired temperature of the zone.

In rendering more accurate the control operation of a main thermal responsive element it is an object to provide an auxiliary thermal responsive element, preferably more sensitive than the main element and operable to exert an actuating force or corrective bias on the principal thermal responsive element, which overcomes mechanical hysteresis and the effects of friction and mechanical inaccuracies in the system.

Still other aspects of my invention concern improved temperature regulating systems for diverse installations, which utilize the principles of my control mechanism to provide better operational results. Several examples of heating installations of the types generally contemplated are herein described to illustrate typical or preferred applications of the control mechanism and its mode of operation. It will be evident, however, that these are by no means the only possible applications of my invention, nor is the described embodiment of my control mechanism its only possible form.

Figure 2:
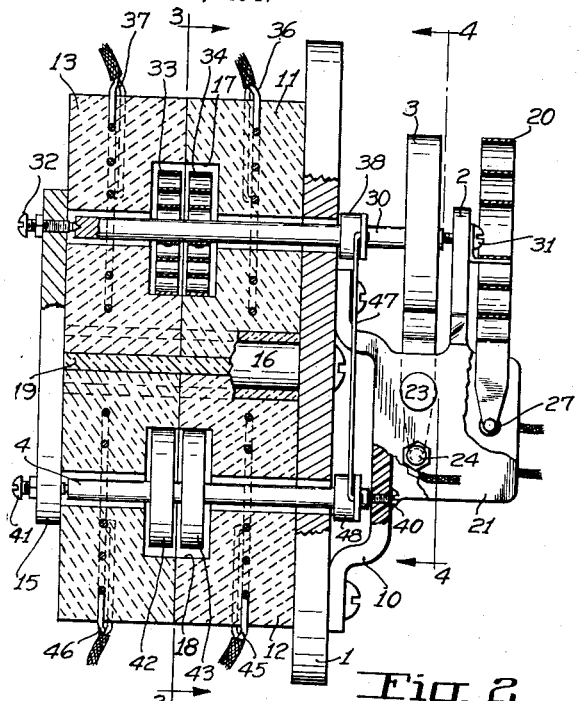
Figure 2 is a side elevation view, with parts broken away, of my basic thermal responsive control mechanism in one form.
Figure 1:
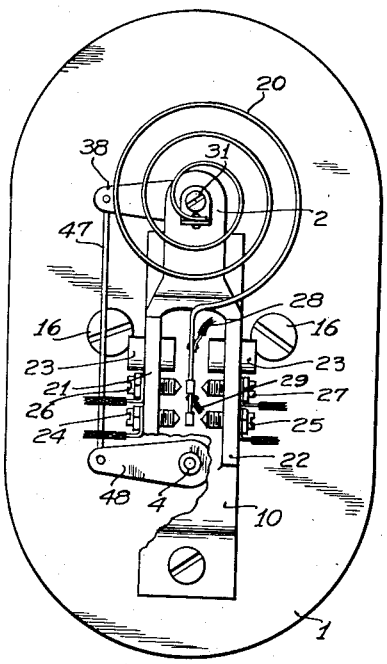
Figure 1 is a front elevation view.
Figure 3:
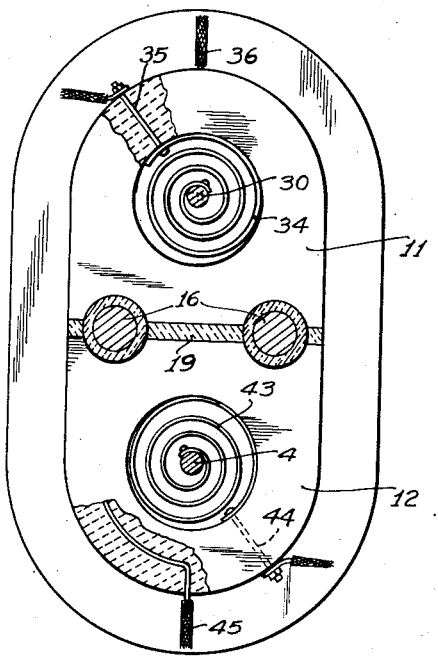
Figure 3 is a sectional view through such mechanism taken along line 3—3 of Figure 2.
Figure 4:
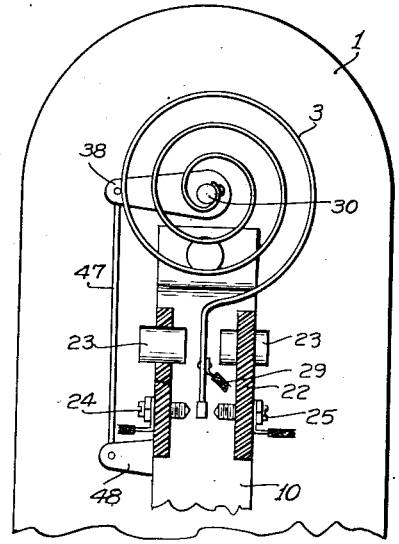
Figure 4 is a sectional view on line 4—4 of Figure 2.

The thermal responsive control unit shown in Figures 1 to 4, inclusive, includes a mounting plate 1 carrying at one side a thermostatic element mounting bracket 10, and at the other side an electric and heat insulating assembly. This assembly preferably includes four heat storage blocks 11, 12, 13, and 14, which blocks are secured between the mounting plate 1 and a backing plate 15 by screws 16 interconnecting these two plates. Preferebaly the blocks 11, 12, 13 and 14 are made of high specific heat material, such as a suitable ceramic material or steel, and the blocks are preferably designed to have a thermal time constant which approximates that of the room or space being heated under control of the regulatory apparatus. Between blocks 11 and 13, on the one hand, and 12 and 14, on the other hand, a heat insulating layer 19 extends to insulate the upper and lower blocks thermally from each other. The abutting faces of blocks 11 and 13 and the abutting faces of blocks 12 and 14 are complementally recessed to form cavities 17 and 18, respectively. Moreover, these blocks have two shaft-receiving bores extending transversely of plates 1 and 15 through the center of such cavities.

Passing through one of these bores and its communicating cavity is a shaft 30 which is centered in that bore for free rotation therein, the ends of the shaft receiving anti-frictional support from cone-tipped center screws 32 and 31, threaded respectively through the backing plate 15 and through a supporting finger 2 included in the construction of the bracket 10. The shaft 30 carries and is connected to the center or inner end of a principal bimetallic thermal sensitive spiral coil 3, and an auxiliary bimetallic thermal sensitive spiral coil 20 is mounted fixedly at its inner end to an angle bracket clamped to the face of the supporting finger 2 by the screw 31. While each of these bimetallic coils may be constructed so that, upon being heated, the spirals will either contract or expand in the mechanism shown spiral elements which contract when heated are illustrated, the metal strip forming the outer layer of such coils having a higher thermal coefficient of expansion than the metal forming the inner strip of such coils. In each instance the outer ends of the coils project downward between ears 21 and 22 of the bracket 10. While the coils do not cooperate with each other mechanically, as a matter of convenience they are mounted coaxially. Although it is preferred that spiral bimetallic coils, as shown, be utilized for the thermostatic elements 3 and 20, because of the greater sensitivity of such coils, and further because the coil type of element is generally better adapted for combination with other features of the control mechanism described hereinafter, the normally straight bar type of thermostatic element could be used in place of either or both of coils 3 and 20, perhaps requiring certain modifications of the specific structure of the mechanism.

Also secured to shaft 30 are the inner ends of coacting bimetallic thermal responsive motor coils 33 and 34 which are received within the cavity 17 of blocks 11 and 13. The outer ends of these coils are anchored by bolts 35 to the blocks 11 and 13, respectively, and since the coils are formed of two strips of different metals, so that when the coils are heated they tend to wind up further, a torque will be exerted upon shaft 30. As will be explained hereinafter, these coils may be heated either directly by passing a current of electricity through them, or by heat transferred to them from another source such as by heating the blocks 11 and 13 with electric resistance coils 36 and 37 embedded in these blocks.

The temperature of the motors, when elevated is upheld over a greater period of time when the heat derives from the blocks through energization of the resistance coils than it is when the motors are heated directly by current passed through them, because of the ability of the blocks to store more heat and lose it slowly to the motors in the former case, for the same interval of heat energy application in either case.

Extending through the other bore of blocks 12 and 14 and cavity 18 interconnecting the spaced portions of such bore is a shaft 4, similar to shaft 30, which likewise is journaled between the bracket 10 and the plate 15 by bearing screws 40 and 41. Correspondingly, coacting thermal motors 42 and 43, similar to motors 33 and 34, described above, are received in the cavity 18, and have their outer ends anchored to the blocks 12 and 14, respectively, by bolts 44. The inner ends of these thermal motors are secured to shaft 4, and are of the same form as the coils 33 and 34, adapting them to contract when heated and to expand when cooled to exert related torques on shaft 4. In addition to the possibility of heating these thermal motors directly by passing an electric current through them, the heating action may be indirect and of a protracted nature by heating the blocks 12 and 14 with electric heating coils 45 and 46, embedded in them.

In the construction of the motors in paired relationship the consideration was that of compactness for a given torque, and convenience in introducing heating current to them, but single motors could readily be used by employing the shafts 4 and 30 as return electrical lead connections. Moreover, the motors may be of different types. In some instances it may be desirable to employ a helical bimetallic coil encircling each of these shafts, or to employ other current responsive elements operative to effect rotation of these shafts.

Shafts 30 and 4 are coordinated rotatively by interconnecting these shafts by a link 47, one end of which is pivotally connected to an arm 38 integral with or secured upon shaft 30, and the other end of which is pivotally secured to an arm 48 integral with or secured upon shaft 4. The motor pairs 33, 34 and 42, 43 are connected to their respective shafts 4 and 30 in such manner that the pairs will tend to turn the shaft 30 oppositely with the same direction of temperature change applied to each pair. For example, heating the motors 42, 43 may effect rotation of shaft 30 tending to uncoil thermostat 3, and the heating of motors 33, 34 would produce a force on shaft 30 tending to coil thermostat 3 more closely.

The outer end of thermostat coil 3 is disposed between the pole faces of two permanent magnets 23, each embedded in one of the ears 21 and 22 of the bracket 10 and each tending to attract the free outer end or armature of the thermostatic coil. Contacts 24 and 25 are also mounted in ears 21 and 22, respectively, and disposed at opposite sides of the coil armature. When a sufficient force is exerted by or upon the coil to shift its outer end from the central or neutral position it is aided by the magnet toward which the coil end has moved and, before such movement has progressed far, is snapped or drawn quickly and positively by magnetic force into contacts with the contacts 24 and 25 adjacent to such magnet. Owing to the continuance of such magnetic force the coil end may not be removed from the contact 24 or 25 until a considerable retractive force has been applied to the coil in the opposite direction, sufficient to overcome the magnetic force. When such retractive force is sufficient to disengage the coil end from such a contact by overcoming the magnetic holding force on the coil end, its resulting disengagement from the contact will also occur abruptly, so that the end of coil 3 will always execute a sharp make or break action. In this respect, one of the coil bimetals may be steel and the other copper, if desired, to provide magnetic interaction with the magnets 23.

In order to render the auxiliary coil 20 more sensitive than the principal coil 3, that it may serve as a vernier or compensative adjustment means in the mechanism, magnets corresponding to magnet 23 are not provided to influence its operation and the contacts 26 and 27 may, if desired, be spaced appreciably more closely than the contacts 24 and 25 although for convenience in illustration they appear at approximately the same spacing in the figures. Sensitivity is also determined, of course, by the bi-metal used and its coiled length. In the illustrated mechanism coil 3 is free to engage either of its contacts in the usual way without being influenced by magnets or, it may be added, by a shift of its supported end, which latter is anchored by the fixed screw 31. In providing for the passage of an electric current through the outer end of coil 20 and one or the other of contacts 26 and 27, a connection 28 may be made to the outer end of such coil, and a similar connection 29 may be made to the outer end of coil 3, for current flow through contacts 24 or 25.

Figure 5:
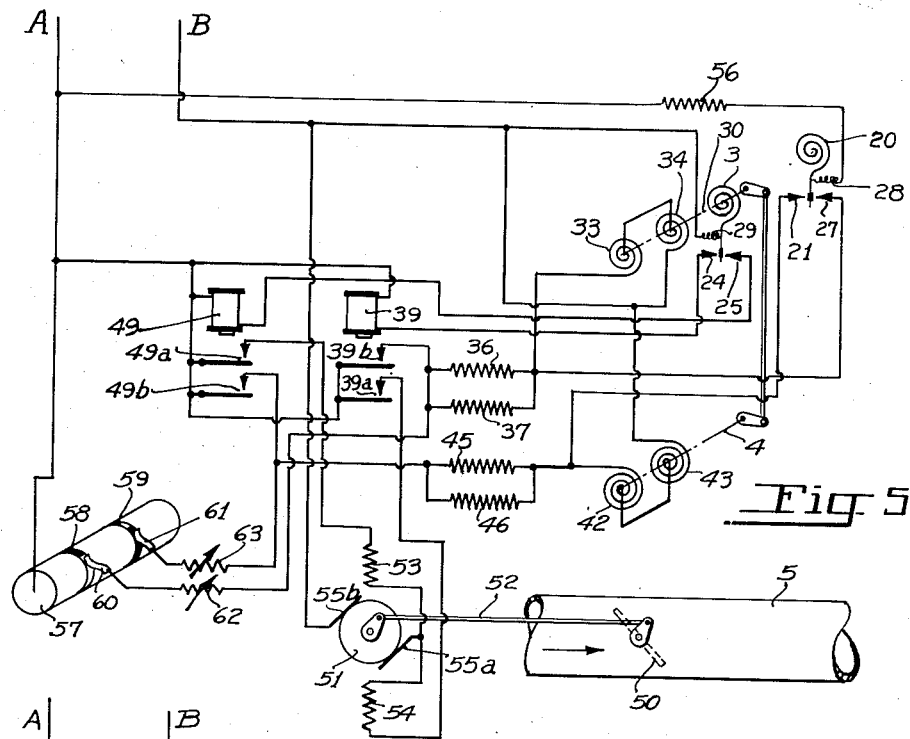
Figure 5 is a wiring diagram of a heating control installation incorporating my thermal control mechanism, shown diagrammatically.

In its principal aspects, the operation of the thermostatic control mechanism described above may be best understood by considering its application in the representative installation of Figure 5, involving a heating system controlled by a damper or valve. Introduction of heating medium to the zone to be controlled takes place through a conduit 5, the degree of opening of which is controlled by the throttling member 50. Thus the heating medium may be air, in which event the throttling element will be a damper, or the heating medium may be steam, the controlling element 50 being either a damper or a valve, and this element would be a valve if the heating medium passing through conduit 5 were hot water. In any of these or similar instances the ideal function of the control mechanism would be to adjust the position of the throttling element so that the heat supplied by the medium would just offset the heat loss from the zone to be controlled, thus preserving a uniform temperature with extreme accuracy.

The position of the throttling element 50 is established by rotation of geared electric motor mechanism 51 connected by a link 52 with the throttling element. The geared motor is of the reversible series type, having reversed field windings 53 and 54 commonly connected to one terminal, 55a of the motor armature while its other armature terminal 55b is connected directly to one of the power lines B. The respective ends of the field windings 53 and 54 not connected to armature terminal 55a are arranged to be connected alternatively to the other of the power lines, A, in a manner and according to the controlling effect of the control mechanism, as will be described. Energization of winding 53, and at the same time, the motor armature, will effect operation of the motor 51 in a direction to open the throttling element 50 for increasing the supply of heating medium flowing through conduit 5, whereas energization of winding 54 will cause motor 51 to rotate in a direction to close the throttling element 50 for reducing the flow of heating medium through conduit 5. When the throttling member has been shifted in one direction or the other a certain distance, as determined by operation of the control mechanism, the motor will be deenergized to leave the throttling element in its new position of adjustment until a further controlling effect acts to energize the motor again. If the temperature of the heated zone remains at the correct value no further adjustment of the element 50 will occur.

Energization of winding 53 is controlled by energization of a relay 49 which closes relay switch 49a between power line A and winding 53, and simultaneously closes another relay switch 49b between such power line and the series circuit comprising the parallel heater elements 45 and 46 and the series motors 42 and 43 allied with these heater elements. Similarly, energization of winding 54 is controlled by energization of a relay 39, closing relay switch 39a between power line A and winding 54 and simultaneously closing another relay switch 39b between such power line and the series circuit comprising the parallel heater elements 36 and 37 and the allied series motors 33 and 34. Relay 39 in turn is energized by engagement of the switch contact 24 by the free end of the main thermostat coil 3, and engagement of such coil end with contact 25 energizes relay 49. Therefore, engagement of the thermostat coil 3 with either of the contacts 24 or 25 is effective to operate the geared motor 51 in one direction or the other, depending on the contact engaged, to modify the positioning of the throttle element 50.

Generally in the operation of this form of control system, at the regulated temperature of the zone the end of the thermostat coil 3 tends to be positioned substantially midway between the contacts 24 and 25. If the temperature tends to rise above this value contact 24 will be engaged by the thermostat, thereby effecting repositioning of the throttle element 50 in such direction as further to restrict the flow of the heating medium in the duct 5 to correct the temperature. The opposite effect will result from a drop in temperature below the regulated level, through switching engagement with the contact member 25.

When the mechanism is first adjusted to regulate at a selected temperature, and the ambient temperature differs substantially therefrom, the intermittent corrective adjustments of throttle 50 effected by ambient temperature thermostat 3 will in the first instance be great. As time passes and the ambient temperature approaches the regulated value the magnitude of these adjustments decrease, until, when the system is operating normally to hold temperature at the regulated value, the amount of each adjustment, up or down, depending upon the direction of temperature error, will be substantially the same, small in magnitude. Corrections are thereby effected rapidly for large errors, but because they taper off in magnitude as temperature error decreases, overcorrection and hunting are minimized.

For a given temperature error existing at the outset a proportional thermal actuated force will be developed by thermostat 3 urging such thermostat against one of its contacts. Such contact will be held for the period of time until the opposing thermal motor pair is heated enough by current flowing therein to break such contact, the length of such period therefore depending upon the magnitude of temperature error. The amount of each correction effected by thermostat 3 is thus likewise dependent upon temperature error, and as the error decreases the recurring corrective adjustments decrease accordingly until the minimum is reached, which corresponds to the regulation of the system and is in part dependent on the force of attraction of the magnets 23.

The time interval between successive corrective adjustments is dependent upon the cooling-off time of the thermal motors heated to force the thermostat element into switch-open position during closure thereof. This interval is lengthened by the heat storage effect of the heat storage blocks, thereby delaying reclosure of the thermostat contact. The amount of such delay is designed in each heating system to correspond to the thermal lag or response of the system and space being heated, as mentioned. Particularly is such delay period a desirable feature because of the heat storage capacity of furnaces and other heat sources, tending to produce temperature overshoot.

An auxiliary, preferably more sensitive thermostat 20 when adjusted to the same control point as thermostat 3, serves to set a corrective bias on the main thermostat, which bias is felt generally over extended regulation periods, and which adds to the sensitivity and accuracy of the mechanism by overcoming mechanical hysteresis and friction, yet without altering other desirable aspects of its operation.

Attention is now directed to more detailed consideration of the operation of the mechanism. With one of the contacts 24 and 25 engaged by the free end of the thermostat coil 3, local heating current flows in the counteractive heater elements and that pair of motors which, through their heat contraction, tends to break such contact by displacing the shaft 30. The motor heating time required to effect a break in any instance will be determined by the existing temperature error when such error is large, because it is this error which determines the contraction or expansion of the thermostat 3 to be overcome by the motors in separating the thermostat from the contact then engaged. During the process, geared motor 51 is active in adjusting the position of throttling element 50.

Upon successive corrective adjustments of control element 50, as the temperature nears, but before it reaches, the regulated value the required contact breaking effort of the heated motor pair to overcome the force of the thermostat directed toward the contact decreases, hence the time required to develop such force by heating the thermal motors decreases. Each time contact has been broken by the effect of the heated thermal motor, the period of time required to reclose the circuit is measured by the quantity of heat which has been accumulating in the heat storing blocks and is available for application to the motors. Consequently, during such period the influence of the motors is exerted on the thermostat to expedite or advance its closing with the opposite contact. This effect provides anticipatory action which prevents temperature overshoot.

If the temperature continues to rise at too rapid a rate, the opposite contact will be engaged by the thermostat, promptly because of the continued high thermal motor torque and the further contraction of thermostat 3, thereby to correct the throttle position and to oppose an overshoot of temperature. The greater the temperature change effected by prolonged engagement of the thermostat with terminal 25 the more heat will be stored in the blocks and available to lend contractive force to the motors to oppose the consequent greater tendency of the heating means, because of what might be termed thermal inertia, of such means to carry the temperature beyond the selected value. The corrections called for in readjusting the throttle are thus met proportionally, a corresponding but opposite effect being produced by motors 33 and 34 for downward temperature adjustments. Moreover, it will be evident that the action of the apparatus is positive in both directions of change because of the bilateral action of the opposed thermal motors. Because of the direct association of the heating elements and the opposed motors with the thermostat, ambient temperature changes do not impair the results.

Preferably, the thermal time-constant of the room or zone being heated is approximated by the thermal time constant of the blocks and elements associated therewith acting on the motors. As a result temperature adjustments are made with the least tendency to hunt.

The magnets 23, being of fixed effect in holding thermostat 3 in its contact positions impose a minimum contact holding period on the mechanism, which allows a certain minimum time for the adjustment of the throttling element. Without the presence of the magnets in a given instance there might be scarcely sufficient expansion or contraction of thermostat 3 to make contact. When the magnets are provided the thermostat can not become suspended just out of reach of a contact, but will be drawn into engagement with it and held there for a period sufficient to effect at least some corrective action of the damper adjusting mechanism.

For precise control over temperature, supplementing the thermostat 3 and coacting therewith, I have provided the auxiliary thermostat coil 20, which operates in conjunction with the thermal motors effectively to bias thermostat 3 by corrective amounts felt most over a period of regulation at a particular temperature. This it does through supplying a bias heating current through one or the other pair of thermal motors, depending on the direction of temperature error, the bias continuing until the error is corrected. The amount of this bias does not increase indefinitely with time of closure of thermostat 20, but preferably levels off at a value which just compensates for system mechanical hysteresis, inaccuracies and friction, so that sensitivity of thermostat 20 is unimpaired by any of these usual sources of inaccuracy. Resistor 56 limits the amount of current passed through the thermal motors by action of thermostat 20 and thereby limits the effect of thermostat 20 on the action of thermostat 3. When ambient temperature departs from the regulated value thermostat 20 makes contact well in advance of thermostat 3 and through the thermal motors mechanically biases thermostat 3 toward the proper switch contact. This bias conditions thermostat 3 so that contact will be made directly upon temperature error becoming excessive, because then it is not necessary for the thermostat 3 to deflect the amount necessary to overcome friction and mechanical hysteresis. Compensating bias produced by thermostat 20 had already accomplished that. The system is preferably designed so that full bias of thermostat 20 is felt on thermostat 3 in a matter of a few minutes, more or less.

Auxiliary thermostat 20 tends to expedite contact of thermostat 3 and, over a period of time, thus tends to maintain centering of the principal thermostat and thermal motors. Although not particularly illustrated in the drawings, the sensitivity of thermostat 20 is conveniently derived from a close spacing of its contacts, although it may be obtained in the design of the thermostat element itself. With thermostat 3, however, it is desirable that an appreciable contact spacing be maintained; otherwise the persisting torque of a heated thermal motor pair, just after having broken switching contact of thermostat 3, would carry the latter into its opposite switching position, fostering hunting. Thermostat 3 is thus provided with an inactive or neutral inter-contact zone, in which a normally heated thermal motor pair may move this thermostat without making contact. A heated motor pair expediting contact of the main thermostat prevents overshoot of temperature after an extensive temperature adjustment.

As a matter of convenience, adjustment of the control mechanism may be effected in various ways. In one of these the thermostat contacts may be mounted together on a shiftable support for displacement together relative to the thermostat. Thus the contacts may be moved individually or may be mounted on a movable bracket for conjoint and equal adjustment to alter the control temperature which the thermostat operates to maintain.

It is often convenient to regulate a heating control system to maintain different temperatures throughout different periods of the day or over a longer period of time involving holidays and the like when no heat or less heat is required. In the present control system I have provided for such regulation by the use of a time switch comprising a motor-driven switch rotor 57 having adjacent switch contact bands 58 and 59. These bands are composed of conductive and nonconductive arcuate sections, each conductive section of one band being aligned with a nonconductive section of the other band. These bands are engaged, respectively, by contact brushes 60 and 61 connected in parallel with the relay switches 39 and 49, respectively, for supplying limited heating current to the respective groups of heating elements and thermo-sensitive motors without energization of relays 39 and 49 from the power lines A and B, to impart bias to either group selectively. The amount of current thus supplied may be determined by the adjustment of variable resistors 62 and 63, connected in series with the brushes 60 and 61 respectively, the effective resistance value of these variable resistors establishing the change in control or regulated temperature which the control mechanism will maintain. To produce these current variations by the rotary switch 57 as a function of time, the rotor may be driven by a synchronous motor.

Assuming that each of the bands 58 and 59 is composed of only two arcuate sections, each of substantially semicircular shape, one corresponding to day and the other to night, when the brush 60 makes contact with the conductive portion of the band 58, such as during the hours of nighttime the brush 61 is on the nonconductive area of the band 59. At this time the resistor 62 is connected in series with the heating elements 36 and 37 and the thermal motors 33 and 34 to allow passage of current through them to elevate the temperature of the thermal motors a predetermined amount, determined by the setting of the variable resistor 62, and produce a corresponding change in bias of thermostat 3, making it regulate at a lower temperature. During the day, brush 61 will engage the conductive section of band 51, to connect the variable resistor 63 in circuit with the heating elements 45, 46 and the thermal motors 42 and 43 across the power lines while brush 60 will contact the nonconductive portion of band 58 to effect a lowered temperature. During daytime, with resistor 62 disconnected and resistor 63 connected in the circuit, current flowing through motors 42, 43 and heating elements 45, 46 biases thermostat 3 to cause it to regulate at a higher temperature. To achieve this result operationally, without either of the resistors connected in the circuit, the mechanism is first adjusted to regulate at an arbitrary temperature chosen between the day and nighttime temperatures to be produced. That is, if the daytime temperature is chosen at 73° F. and that at night, at 65°, the mechanism might be set to regulate perhaps at 69° F. Consequently, resistor 63 must then be adjusted to allow sufficient current to flow through its heating elements and motors to effect an increase of 3° F. in regulation temperature from the basic value of 69° F., whereas the adjustment of resistor 62 will be such as to produce a 4° drop in regulated temperature from the value of 69° F. This is because heating the separate pairs of resistors respectively causes opposite shifts in position or bias of thermostat 3.

It will be recognized, however, that the same result may be reached by altering the circuit to different forms, such as by joining the terminals of the two resistors 62, 63, on the side away from switch 57, and connecting them commonly to one or the other of the groups of heater elements and corresponding motors. Depending upon which is chosen, the basic temperature at which the apparatus is adjusted to regulate without the resistors will be set above or below both of the temperature values for day and night operation. This will be done in order that such temperatures may be produced by the presence of the respective resistors effecting different corrections in the bias of thermostat 3 in the same direction, and not oppositely, from its base position.

Figure 6:
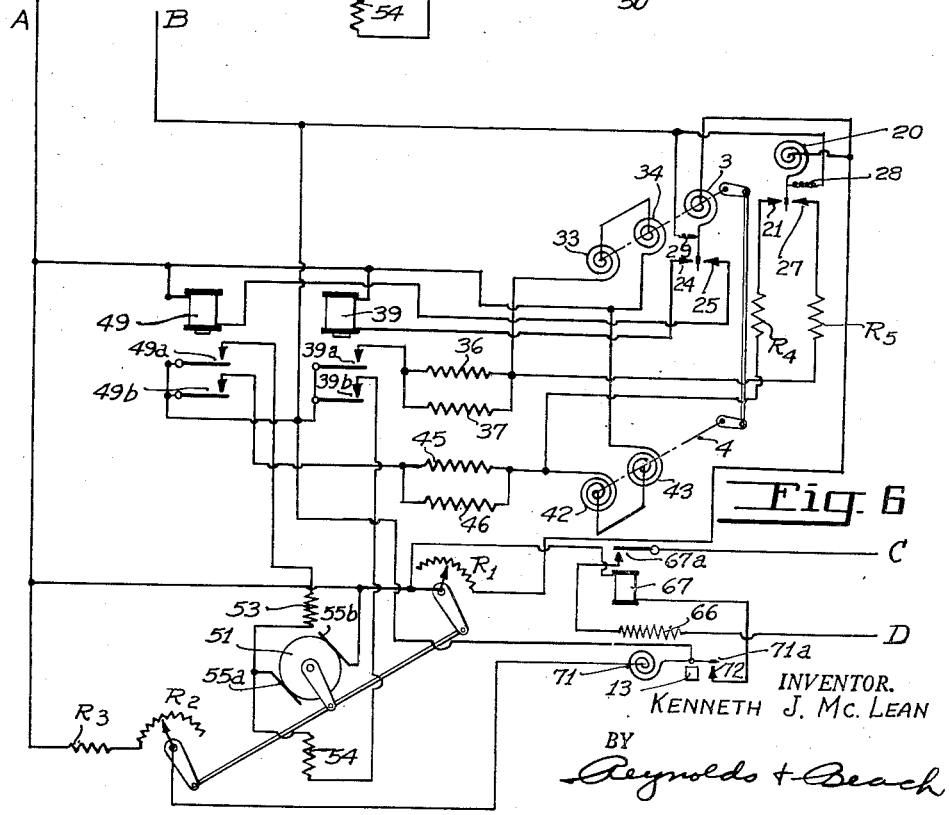
Figure 6 is a wiring and schematic diagram of a different form of heating control system incorporating my thermal control mechanism.

By selecting different numbers of bands and/or different lengths of conductive and nonconductive strips the program may be varied to suit various occasions. Alternatively, the switch rotor 57 may be stopped to maintain a constant regulated temperature at all times, the mechanism being set for a given regulated temperature by adjustment of one of the variable resistors. When this is done, however, the contacts or position of thermostat 20 must necessarily be adjusted to the same control point as is then imposed on thermostat 3, if the former is to remain effective as a compensating member. Similarly, when the switch 57 rotates, alternating the bias applied to thermostat 3, thermostat 20 can only be set to operate at one of the control points, preferably the daytime control point. At night, or at a different temperature control point, thermostat 20 will be incapacitated as a compensating device unless it is readjusted. Later herein, by reference to Figure 6, an arrangement by which both thermostats may be controlled together is described. For many purposes, however, the system of Figure 5 is adequate since precise regulation at night usually is not necessary. It will be evident that various other switching apparatus may be employed to achieve the operational effect just described in lieu of switch 57 and associated components. The important aspect of such operation is the simple and automatic manner of adjustment involving the effect of bias on the thermal motors reacting on the control thermostat.

In another general type of heating system embodying the invention the heating medium or heat-producing means may be of the on-off type, so-called because the desired zone temperature is attained and regulated by the intermittent supply or injection of heating energy or medium, which energy or medium is turned on to its full flow capacity and turned off intermittently during regulatory periods. This is to be distinguished from the foregoing described system in which the flow of heating medium or energy is continuous but variable.

An example of a system of the on-off type is found in one form of radiant heating system, wherein the heating elements, such as electrical resistance coils, or electrically heated hot water coils, are intermittently supplied with heating current from a power line. An improved radiant heating system of this general description has been illustrated in Figure 6, utilizing my novel control mechanism.

Generally, in heating a room or other zone by radiant heat, such as with coils embedded in the walls, there are two temperature effects manifested on persons within the room or zone. One is that of the ambient air temperature and the other is the effect of radiant heat absorbed by the human body or objects in contact therewith. The effects are largely independent, although it will be understood that the air or ambient temperature of the room gradually rises during injections of radiant heating energy. As such injections continue to the point where the most comfortable conditions are reached, warmth will be derived predominantly from the effect of ambient or air temperature, and to a lesser extent from the radiant energy heating effect. Moreover, as air temperature rises the average radiant heating effect should fall, to maintain a continuous sensation of regulated warmth by balancing the two effects. The wall, floor or ceiling in which the heating element is embedded may itself act as a radiant heating element, and it will tend to lend stability to the heat radiation because of thermal lag of the wall materials.

In the illustrated radiant heating system in which my improved control mechanism is employed I provide for the accentuation of radiant heating when air temperature is low and correspondingly for the reduction of radiant heating with a rise of air temperature, to maintain overall conditions of comfort in the room the full while. Thus, when the air temperature reaches a certain value, perhaps 65° F., the temperature of the radiant surface may then be at 80° F., more or less, for comfort under normal conditions. The source of heat in the system, the radiant heating element, comprises the electrical resistor 66 adapted to be supplied with electrical current from power lines C and D, for instance through the switching elements 67a of a control relay 67. The resistor 66 may comprise a coil of wire suitably embedded in the wall or ceiling of a room, or it may be the heating element for a hot water coil similarly located. In either case the flow of current in the heating element 66 may be effected conveniently by energization of the relay 67 by the engagement of the outer end 71a of a radiant energy sensitive "black body" thermostat coil 71 with the thermostat switching contact 72. This thermostat, which may be generally of a conventional bimetal type, is position near to and directed towards the source of radiation so as to respond accurately to the intensity of radiation, the response being in terms of expansion and contraction of the bimetallic spiral coil 71. If desired, the thermostat may be shielded to prevent circulating air currents affecting its operation, while allowing radiant heat energy to be received by the thermostat element. Preferably the thermostat 71 is of the type incorporating a contact-holding magnet 13 or other means causing the thermostat to make contact on falling temperature at a lower point than the breaking of contact on rising temperature. In addition, thermostat 71 is so arranged that its bimetal coil, as an electric resistance, may be heated supplementally by current flow, producing resistance losses, adding to the heat of absorption.

The system further comprises main and auxiliary thermostats 3 and 20 which control on the basis of ambient or air temperature changes, in cooperation with the radiant heating control afforded by the black body thermostat. As in the preceding case, geared motor 51 receives energization through switching relays 39 and 49 in accordance with the energization of such relays by the principal thermostat 3. When these relays are individually energized one or the other groups of heater elements and thermal motors becomes heated, acting to break the switching contact of thermostat 3 causing such energization, as explained above. Again the heater elements and heat storage means are used conjunctively with the motors for the same general operational purposes as in the system previously described, allowing temperature stabilization of the heated zone to take place after a contact period of thermostat 3 and before that thermostat may make further contact calling for a further correction of the positioning of geared motor 51. The bimetal coils of thermostats 3 and 20 in this instance constitute electric resistance elements adapted to be heated by flow of current through them.

When the geared motor is energized for rotation, variable resistors $R_1$ and $R_2$ are changed inversely in setting, which changes the bias or control points of the black body thermostat 71 and the principal and auxiliary thermostats 3 and 20, respectively, by varying the amount of heating current which flows through the bimetal coils of the thermostats and thus their respective initial amounts of expansion or contraction. Thus, the control point of the black body thermostat 71 may be varied by causing varying amounts of heating current to flow through the thermostat coil and the control resistor $R_2$ connected in series with such coil. In this instance, the greater the setting of this resistance the less the bias effect on the thermostat, thereby simulating the effect of lower radiant heat, and effecting more frequent and prolonged closures of contact 72 with the black body thermostat coil to effect energization of the relay to elevate the temperature of the zone. Consequently thermostat 71 regulates at a higher temperature. Correspondingly, $R_1$ by its setting determines directly the bias effect on thermostats 3 and 20 together, a decrease in setting of $R_1$, accompanying an increase in $R_2$, causing these thermostats to regulate at a lower temperature point. Thus, the temperature point at which the ambient temperature thermostats 3 and 20 regulate is inversely related to the average controlled radiant heat being generated or the regulating point of the black body thermostat 71.

Through the interrelation of the several thermostats by means of the variable resistors $R_1$ and $R_2$, a balance is struck and maintained between the temperature of the air and that of the radiant surface. This balance will depend upon the rate of heat loss of the zone being regulated, for on days of warm weather very little radiant heat will be required to maintain comfortable conditions, the air temperature being relatively high, whereas on cool days the air temperature of the zone will tend to be low with an accompanying higher radiant energy output to compensate for the difference. Under varying conditions of external temperature, therefore, the effective zone temperature will be comfortable, represented by a composite of air temperature and radiant heat temperature, in varying proportions.

Operationally, the basic control of the system may be considered to derive from the ambient temperature thermostats, augmented by the black body thermostat, since it is the current impulses applied to the geared motor by the action of thermostat 3 which determines the operating point of the black body thermostat. If an adjustment in the regulated temperature of the zone is to be made by a different setting of the control mechanism, it is preferable to do so by varying the bias of thermostats 3 and 20, such as by varying the amount of quiescent heating current flowing through both thermostat coils, or by mechanically shifting the positions of the contacts of both thermostats relative to such thermostats. If these two thermostats are adjusted by like amounts, the normal relationship which thermostat 20 bears to 3 will be preserved throughout a range of adjustment, and the ambient temperature may be held within the close limits of regulation of thermostat 3 augmented by thermostat 20 acting through the thermal motors and through either of current limiting resistors $R_4$ or $R_5$ when thermostat 20 engages either of its contacts. Resistors $R_4$ and $R_5$, in the respective contact leads, replace resistor 56 in Figure 5 so that they do not impede flow of bias current through the thermostat element. As in Figure 5, the resistors limit current through the thermal motors. In this respect and in the other aspects of the operation of the ambient temperature portion of the system, including the heating elements, thermal motors and switching relays, the operation is similar to that of the corresponding means in the system of Figure 5, and the advantages of stability and closeness of regulation are likewise carried over into the present system.

If it be assumed that the system is suddenly put into operation after a period of low temperature in the zone to be heated, to effect a major increase in temperature of the zone, the action is as follows. Thermostats 3 and 20 immediately engage their respective contacts 25 and 27 and hold that position usually, depending upon the temperature discrepancy, until after the geared motor 51 has effected full or maximum setting of resistor $R_2$. Black body thermostat 71, now under the influence of a reduced bias current, effects energization of relay 67, thereby energizing the radiant heater element 66. As heat is supplied to the zone, the air temperature will gradually rise to the point where thermostat 3, which had been under the influence of the low ambient temperature of the zone and of a reduced bias, determined by the low setting of $R_1$, breaks its contact. At first there is no immediate effect on the operation of the black body thermostat 71 because the setting of $R_2$ continues unchanged. As ambient temperature continues to rise, however, a point will be reached at which thermostat 3 will engage contact 24 to produce a downward adjustment in the setting of $R_2$ and an accompanying increase in $R_1$. Consequently, more bias current will flow to thermostat 71 and less to thermostats 3 and 20, which represents the first step in the process of achieving equilibrium in the adjustment of the apparatus, with the proper balance between air temperature and radiant surface temperature in the zone.

During and between successive corrective adjustments applied to the variable resistors thermostat 71 intermittently makes and breaks the circuit through heater control relay 67 to maintain the radiant heating effect within the limits of comfort based on the existing air temperature at the times it operates. If the air temperature is high, thermostat 3 will effect energization of the heating element 66 less frequently and it will be energized over shorter periods than if the temperature of the air is low. When finally the air temperature reaches equilibrium, it does so at a point where the heat losses from the zone bear a fixed relation to the supply of radiant heat, and whatever may be the point of equilibrium the intensity of radiant heat affecting individuals in the zone may be comfortable at that particular air temperature. Once equilibrium is reached the system will then regulate to maintain that equilibrium, general or average temperature changes being felt and responded to by thermostats 3 and 20, and the more frequent rises and drops of radiant heat intensity about an average value determined partly by the setting of $R_2$, being felt and maintained within limits by the black body thermostat 71. Clearly the point at which the air temperature reaches equilibrium is inherently determined by the various constants of the mechanism and by the external temperature at the time.

In this system a time switch may be incorporated very readily as a means of establishing the temperature at which the device will regulate during chosen periods of time. This may conveniently be accomplished by a selector switch in the lead of $R_1$ which would insert various values of resistance in series with that lead as a means of varying the biasing current flowing through thermostats 3 and 20, and thus their control point, as a function of time.

Figure 7:
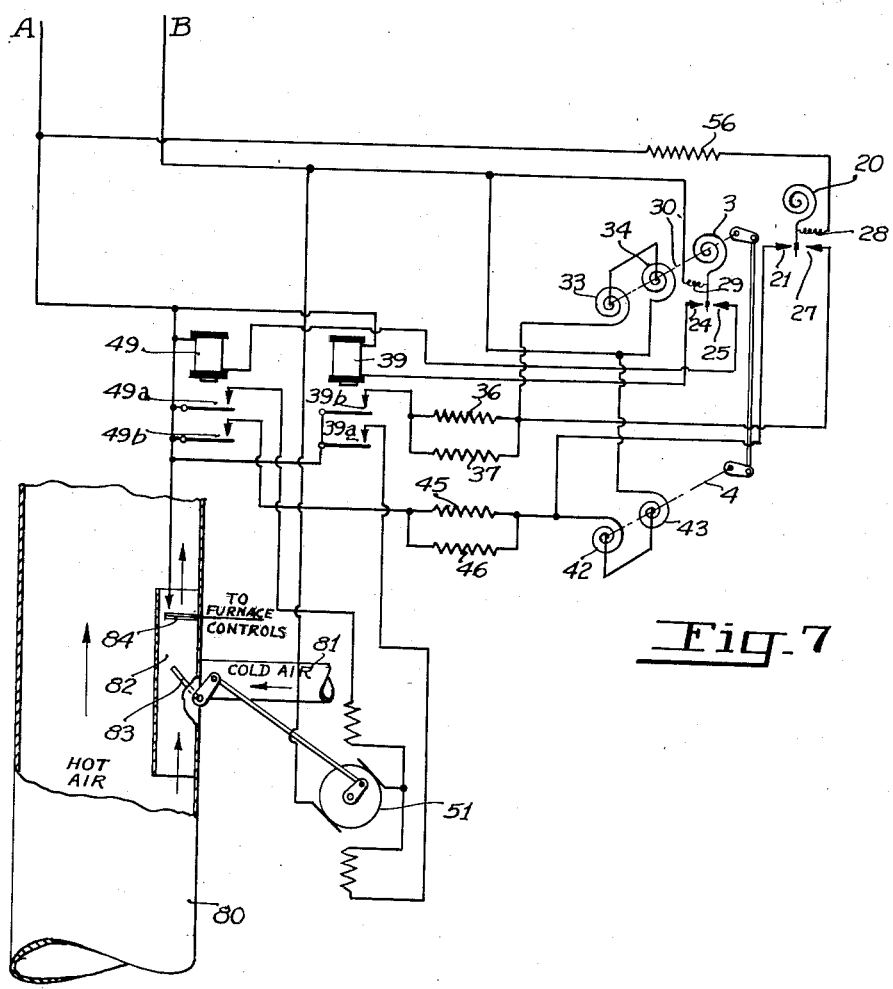
Figure 7 is a wiring and schematic diagram of another heating installation employing my thermostatic control mechanism.

In Figure 7 my novel control mechanism is illustratively embodied in an improved heating system of a still different type, wherein it modulates the cycling time of the controls of an on-off type heat generator, examples of which are various on-off types of oil or gas air circulating heaters. As will become evident from the exemplary case which is described there are various such existing installations to which my control mechanism may be made supplemental with minimum additional cost of alternation for its incorporation. In the figure the heated air moves through an air duct 80 leading from the output side of a circulating furnace (not shown) to the room to be heated. Cold air, which may comprise returning air tapped from the lower level of the room will be circulated back through the system to pass through the heater again. By by-passing the heater a portion of this cool air may be passed through a duct 81 into an internal subduct 82 wherein a mixture of cool air and such portion of the warm air stream of the main duct may be effected in relative amounts determined by the positioning of a two-way throttling element 83 located at the junction and adapted to be positioned through linkage by the geared motor 51.

In the subduct 82 or at its exit is located a simple thermostat 84 of conventional design, which is adapted to make and break an electrical contact in response to temperature changes in the subduct to control the turning on and off of the oil, gas, or other, heater unit employed. This thermostat is preferably of the type adapted to close such electrical contact with dropping temperature at a lower temperature point, perhaps 10° to 15° lower, than the point at which the contact is opened on rising temperature, thereby affording a time lag during which the heater unit may be turned on by such thermostat to produce a controlled quantity of heat before it is again turned off.

In controlling the main duct temperature at which thermostat 84 regulates I employ my ambient temperature control mechanism, locating the control unit thereof in the room being heated and utilizing suitable means, such as geared motor 51, to regulate the position of two-way throttling element 83. As more or less cold air is introduced into the subduct to influence thermostat 84 the main duct temperature average is caused to rise or fall accordingly.

In its operation a great improvement in heating efficiency and degree of regulation results from such an arrangement over conventional systems. This is due not only to the particular advantages of using the improved control unit, but to the substantially complete elimination of thermal inertia effects of the heat source, which is the result of the location of thermostat 84 whereby, in conjunction with the main control unit, not only is the regulation based on room temperature, but on duct temperature as well. It will be noted that duct temperatures, which normally tend to swing through a wider periodic variation than do room temperatures during temperature regulation, afford a more positive reference from which to anticipate over and undershoot of temperatures during the on and off periods of the furnace. In principle, the effect is somewhat analogous to that of the radiant heating system previously described, comparing the thermostat 71 there with the thermostat 84, and the biasing resistor R₂ with the two-way throttling element 83, although of course, the mode of heating differs in the two cases.

Figure 8:
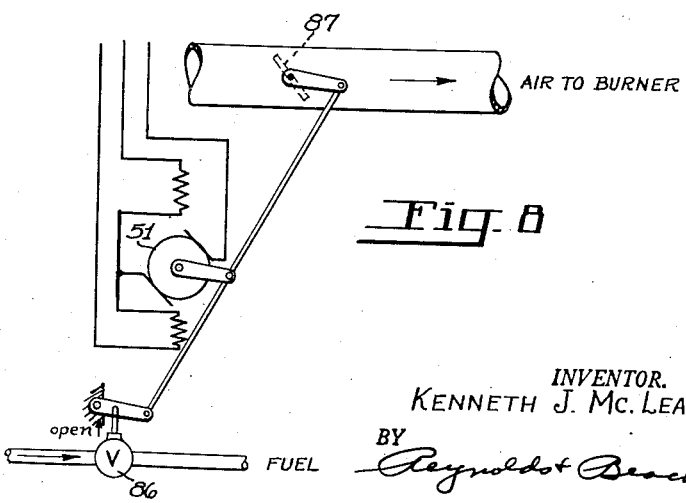
Figure 8 is a diagrammatic view of still a different type of heating control installation to which the wiring and control system shown in Figure 5 or Figure 7 may be applied.

In Figure 8, I have indicated the heat control device of an alternative heating system, which device may be employed in conjunction with the control systems of either of Figure 5 or 7 for example. Here a fuel control valve 86 and a combination air throttle 87 are controlled coordinately to regulate efficiently the flow of combustion elements to a furnace. It will be understood that the valve and throttle control means may be substituted for the duct means indicated in the system of Figure 5 to similar purpose and effect, the air and fuel flow being then regulated in accordance with the temperature responsive action of thermostat 3.

I claim as my invention:

1. A temperature regulating system comprising a heat source control device, electrically controlled actuating means for operating said device, and thermostatic control means operable to control said actuating means bidirectionally in response to temperature fluctuations above and below a regulated value, said thermostatic means comprising a principal temperature-sensitive switching element having opposite switching positions, opposed thermal motors operable to move said switching element oppositely in response to heating effects on said motors, an auxiliary temperature-sensitive switching element having opposite switching positions and being substantially more sensitive to changes in temperature than said principal temperature switching element, electrical resistance heating means in circuit with and energizable by actuation of either of said principal and auxiliary switching elements and operable to heat said thermal motors selectively for moving said principal switching element, and means for limiting the flow of current through said heating means when energized by said auxiliary switching element to a value less than the flow of heating current through said heating means when energized by said principal switching element.

2. A temperature regulating system as defined in claim 1, additionally comprising individual heat storage means disposed adjacent to the respective thermal motors, a heating element for each of said heat storage means, and separate circuit means in circuit with the principal switching element and operable to energize said respective heating elements by respectively opposite switching actions of the principal switching element.

3. A temperature regulating system as defined in claim 1, and bias means operable to produce a controlled heating effect on one of the thermal motors to alter the value of the temperature regulated by the system.

4. A temperature regulating system as defined in claim 3, in which the bias means comprises a source of heating current, and a time-operated switch having at least one output lead in series with said source of current, and variable current limiting means connected in series with said output lead, whereby a temperature program may be imposed on the system by variously biasing the thermal motors on which the biasing means is operable for a predetermined period of time.

5. The system defined in claim 1 wherein the heat source control device comprises a radiant heat thermostat operable in response to radiant heat intensity above a predetermined upper limit to reduce the output of a radiant source and, below a predetermined lower limit, to increase the output thereof, means controlled by the electrically controlled actuating means for biasing said radiant heat thermostat automatically in response to operation of the principal temperature-sensitive switching element, for varying said limits together, up or down, inversely in relation to variations in average heat output affecting the principal temperature-sensitive switching element.

6. In a regulated heating system, a heated-air main supply duct, a subduct defining a bypass channel for heated air flowing in said main duct and communicating with a sorce of relatively cool air, throttling means for controlling the relative mixture of cool and heated air in said subduct, thermostatic on-and-off heater-control means located in the path of flow of said mixture of air and operable to energize a heat source acting to heat the air in said main supply duct when the temperature of the mixture drops substantially a predetermined temperature, and to deenergize the heat source when the temperature of the mixture rises substantially above such temperature, and mixture control thermostat means operable to control the positioning of said throttling means in response to temperature changes in the zone being heated, thereby to regulate the temperature of the air acting on said heater control thermostat in response to changes in the temperature of the zone being heated.

7. Thermostat apparatus comprising a principal temperature sensitive switching element adapted to move from a neutral position to opposite switching positions in response respectively to opposite ambient temperature changes, opposed thermal sensitive motors adapted to move said element oppositely in response to independent heating effects applied to said motors, an auxiliary temperature sensitive switching element adapted to move from a neutral position to opposite switching positions in response, respectively, to opposite ambient temperature changes, electrical heating means selectively operable to apply heating effects to said motors and energizable by switching movement of said auxiliary temperature sensitive switching element, switching contacts disposed on opposite sides of the principal switching element defining the switching position thereof, additional switching contacts disposed on opposite sides of the auxiliary switching element an defining the switching positions thereof, and a holding magnet positioned adjacent to one of the contacts engageable by the principal switching element and operable to attract such switching element into engagement with such contact when it enters the concentrated portion of the magnetic field.

KENNETH J. McLEAN.

REFERENCES CITED

The following references are of record in the file of this patent:

UNITED STATES PATENTS

| Number | Name | Date |
|---|---|---|
| 1,886,439 | Wells | Nov. 8, 1932 |
| 2,092,869 | Baum | Sept. 14, 1937 |
| 2,129,477 | Parks | Sept. 6, 1938 |
| 2,148,491 | Moore | Feb. 28, 1939 |
| 2,151,222 | Millard | Mar. 21, 1939 |
| 2,181,606 | Parks | Nov. 28, 1939 |
| 2,182,048 | Elmer | Dec. 5, 1939 |
| 2,189,382 | McGrath | Feb. 6, 1940 |
| 2,204,403 | Crago | June 11, 1940 |
| 2,205,164 | Chappell | June 18, 1940 |
| 2,208,761 | Hartig | July 23, 1940 |
| 2,228,515 | Foulds | Jan. 14, 1941 |
| 2,339,618 | Crago | Jan. 18, 1944 |
| 2,340,158 | Theisen | Jan. 25, 1944 |
| 2,402,240 | Crise | June 18, 1946 |
| 2,425,030 | Clark | Aug. 5, 1947 |

FOREIGN PATENTS

| Number | Country | Date |
|---|---|---|
| 541,830 | Great Britain | Dec. 12, 1941 |
| 585,381 | Germany | Oct. 13, 1933 |